Patented Jan. 17, 1933

1,894,720

UNITED STATES PATENT OFFICE

CONWAY, BARON von GIRSEWALD AND WOLFHART SIECKE, OF FRANKFORT-ON-THE-MAIN, GERMANY, ASSIGNORS TO AMERICAN LURGI CORPORATION, OF NEW YORK, N. Y., A CORPORATION OF NEW YORK

PROCESS OF ELIMINATING ARSENIC FROM ACIDS, PARTICULARLY SULPHURIC ACID

No Drawing. Application filed April 9, 1930, Serial No. 442,994, and in Germany November 13, 1929.

This invention relates to a process of eliminating arsenic from acids, particularly sulphuric acid.

It has been found that a complete or practically complete removal of the arsenic from acids, especially sulphuric acid, or any acid liquids, can be produced if these acids or acid liquids are treated with oxygen acids of sulphur, that contain at least two sulphur atoms in direct combination, or their salts such as thiosulphuric acid or thiosulphate, for instance sodium thiosulphate or thion or polythionic acids or polythionate and the like or mixtures of such substances at temperatures below 50° C. The arsenic is thereby separated out as sulphide which can easily be separated from the solution free or practically free from arsenic.

The process is also particularly suitable for eliminating arsenic from concentrated acids, especially concentrated sulphuric acid, for example that over 50–66° Bé., from which the elimination of arsenic was hitherto possible only to a limited extent.

Although it has already been proposed to dilute such acids with water—for example down to 47–48° Bé.—and then to precipitate the arsenic as sulphide, by means of sulphuretted hydrogen, the acid being reconcentrated to the desired degree after removing the precipitated arsenic sulphide, this process is too expensive owing to the necessity for diluting and re-concentrating the acid. On the other hand, the direct treatment of (for example) concentrated sulphuric acid with sulphuretted hydrogen is attended with the difficulty that, as is well known, concentrated sulphuric acid above 50° Bé. decomposes sulphuretted hydrogen, with deposition of sulphur.

It has already been proposed many times to precipitate the arsenic as a sulphide from arsenic containing sulphuric acid of not over 50° Bé., "chamber acid", at temperatures of 70–80° C. with thiosulphates. At those temperatures, however, it would be quite impossible, due to the increase in solubility of the arsenic sulphide in concentrated acids, for instance in sulphuric acid of 60–66° Bé., to separate the arsenic from such acids, to an even partly satisfactory extent.

In contrast to the opinion prevalent heretofore in regard to the necessity of high precipitation temperatures it has been discovered that by avoiding such high temperatures, i. e., by working below 50° C., it is not only possible to separate arsenic from acid liquids and acids of comparatively low concentration, for instance from sulphuric acid of 50° Bé. and similar low strengths, but also from much more concentrated acids, for instance sulphuric acid of 60–66° Bé., with an economical consumption of the comparatively cheap precipitant, which can be apportioned with ease and certainty, such elimination proceeding up to the limit of detachability, for example 0.0001%, and beyond; and indeed until the arsenic reaction completely disappears, the operation being performed with the greatest ease. The transposition is effected in the simplest manner, by adding the measured quantity of the thiosulphate—for example in the form of a solution—to the acid under treatment, care being taken to ensure rapid and thorough mixing, by the aid of mechanical devices, such as known stirring mechanism, blowing in gases, and the like. The precipitation may be effected at ordinary temperature, and generally it is preferable to prevent the temperature from rising above 35–50° C., or thereabouts, according to the concentration of the acid to be purified. It is therefore advisable to cool the liquid, if necessary, during the introduction of the precipitant (for example in a dissolved condition), or to employ the liquid in an already cooled state, further cooling being applied, if necessary, during the introduction of the precipitant.

The precipitants employed may consist of thiosulphates of the most diverse kinds, i. e., not only alkali thiosulphates (such as sodium thiosulphate or ammonium thiosulphate) but also thiosulphates of the alkaline earths (such as barium thiosulphate), or lead thiosulphate and the like. The employment of thiosulphates, such as those of barium or lead, the cations of which form sparingly soluble compounds with the $SO_3$-ion, has the advantage that, in such case, the cations of the precipitation salts—unlike those of alkali thiosulphates—do not remain in the acid, but are deposited in the form of their sulphates and can be separated, along with the arsenic sulphide, for example by filtration through filter blocks or the like, or by other known methods.

In applying the invention, the precipitant, such as sodium thiosulphate, can be added in excess to the acid—such as 60-66° Bé. sulphuric acid—for example, to the extent of 18-20 parts of $Na_2S_2O_3.5H_2O$ to 1 part of As present. The thiosulphate may be added in the form of a 20-40% aqueous solution, the arsenic being thrown down as sulphide. The excess of precipitant can be afterwards removed by suitable means, such as the addition of a small amount of a suitable oxidizing agent (for example 3% hydrogen peroxide), since otherwise the surplus thiosulphuric acid remaining in the sulphuric acid is easily liable to render the sulphuric acid cloudy through the separation of sulphur. This method of procedure, however, is attended with the inconvenience that, in order to prevent the acid from becoming turbid subsequent to the filtration of the arsenic sulphide, it is necessary to add the hydrogen peroxide prior to filtration, in which case a small amount of arsenic is again brought into solution, especially when the subsequent filtration takes a long time.

It is therefore generally advisable to avoid any great excess of precipitant, this being easily managed by making an exact determination of the arsenic content in the acid, prior to precipitation, and employing no more precipitant—e. g., thiosulphate—than corresponds—for example in treating a sulphuric acid containing about 0.1% of As—to 5-8 parts of $Na_2S_2O_3.5H_2O$ to each part of As found. Of course, these proportions must be regarded merely as an example, and they may be varied, in either direction, according to the conditions of each case. Operating in this manner, the amount of thiosulphuric acid left behind in the acid will be so small that merely a slight deposition of sulphur will occur and will be practically complete by the end of about 24 hours. Hence, if the acid treated with thiosulphate in the described amount be left to stand for 24 hours—or even longer, say 48 hours—before filtration, the filtrate will remain perfectly clear.

Apart from its additional applicability to highly concentrated acids, such as sulphuric acid higher than 50° Bé., the process offers the advantage, as compared with precipitation by sulphuretted hydrogen, of greater simplicity, even if only on account of dispensing with the apparatus for generating the sulphuretted hydrogen and for effecting the reaction with the sulphuric acid. It offers the further advantage of more convenient and accurate apportioning of the precipitant, and the avoidance of the inconvenience caused by the smell and the risk of poisoning. Still another advantage consists in that the presence of $SO_2$ in the acid to be purified has no effect on the thiosulphate, whereas, when sulphuretted hydrogen is used, such $SO_2$ consumes some of the sulphuretted hydrogen, with deposition of sulphur according to the known reaction.

In comparison with the known process of precipitation of arsenic from chamber sulphuric acid of 50° Bé. by means of thiosulphates at 70-80° C., the treatment at low temperatures according to the invention presents the advantage that it permits the precipitation of the arsenic completely or until it can no longer be detected without the necessity for previous dilution even of highly concentrated acids, for instance sulphuric acid of 60-66° Bé., which it was not possible to treat with thiosulphates according to the known process due to the comparatively great solubility of arsenic sulphide in the hot, concentrated acids; and in this way the consumption of heat necessary in the known process is done away with, and the technical difficulties and other disagreeable features involved in the heating of the strong acids and the handling of the same are avoided.

The high strength sulphuric acids, for instance Glovers acid, especially important technically, present special difficulties in de-arsenating according to all former processes since they contain much greater amounts of arsenic than chamber acid, for instance, and moreover, in contrast to the same, they contain the arsenic at least partly in the pentavalent form (which is difficult to precipitate) due to their content of nitrogen oxides.

The process according to the invention is of special importance also for the de-arsenating of arsenic wash acid obtained from the contact sulphuric acid process, as described below and first made possible by this process.

In the treatment of acids containing higher oxides of nitrogen, such as nitric or nitrous acid, it is advisable to eliminate these impurities prior to the treatment with thiosulphates, for example by treating such acids with $SO_2$, an air blast or the like, because even very small amounts of such impurities tend to impede, or entirely prevent, the precipitation of the arsenic sulphide. The employment of $SO_2$ for this purpose seems particularly advisable for the reason that, as already mentioned, an excess of $SO_2$ has no effect on the precipitation of the arsenic with thiosulphate or thionic acid.

Moreover, it has been found that the denitrating can in certain cases be accomplished with advantage by adding small amounts of urea to the solution before the precipitation with thiosulphate.

The fact that the presence of $SO_2$ in the liquids under treatment has no harmful influence on the precipitation process is of extreme importance, inasmuch as it enables the process to be applied also to those grades of sulphuric acid which—as is often the case after denitration—contain certain amounts, such as 2 grams per liter of $SO_2$. This opens up a particularly valuable sphere of application of the process, in the preparation of contact sulphuric acid, in which case the arsenic is washed out of the sulphurous roast gases with the aid of sulphuric acid. This washing process is carried on with cold acid, which takes up the arsenic and also $SO_2$. Hitherto, the resulting arseniferous sulphuric acid obtained in this way and amounting to about 10–15% of the total production, could not be put to any further use in connection with the manufacture of sulphuric acid, but had to be sold, as low-grade acid, to superphosphate manufacturers and the like. The invention now enables the arsenic to be eliminated from such acid, by precipitation with sodium thiosulphate, and the resulting purified acid may be utilized to collect the $SO_3$ formed in the rear of the contact furnace; so that, in this way, the washing acid is recovered, as 100%—$H_2SO_4$, in the process. Moreover the acid which has been freed from arsenic according to the invention can be re-employed as washing acid. This embodiment offers the particular advantage that, in such case, the elimination of arsenic from the acid can be restricted to merely the major portion of the arsenic. In such event the thiosulphate is naturally considerably more efficiently utilized, it being no longer necessary—as when the final traces of arsenic have to be removed—to employ the precipitant in excess.

*Example 1*

5 liters of 60° Bé. sulphuric acid containing 0.096% of arsenic are stirred at ordinary temperature, with a 40% solution of sodium thiosulphate, in the proportion of 6 grams of $Na_2S_2O_3.5H_2O$ to every 1 gram of arsenic. The temperature may, at the same time, rise as far as 50° C. The arsenic sulphide comes down in an easily filterable condition. After the precipitation, the acid contains less than 0.001% of arsenic.

*Example 2*

Sulphuric acid containing 92% (65° Bé.) of $H_2SO_4$ and 0.139% of arsenic is precipitated by stirring with a 40% solution of sodium thiosulphate in the proportion of 7 grams of $Na_2S_2O_3.5H_2O$ to every 1 gram of arsenic. In this case, it is advisable to keep the temperature below 50° C. The acid filters perfectly, and the filtrate contains less than 0.001% of arsenic.

The term "oxyacids of sulphur, containing at least two directly linked atoms of sulphur", referred to in the description and claims, is intended to mean acids, such as thionic acids of all kinds—for example, thiosulphuric acid, dithionic acid and any polythionic acids; while compounds of such acids are primarily intended to mean salts of the same, such as salts of the alkalis or alkaline earths, or other salts, for example the thiosulphates of sodium, potassium, lead or the like.

The term "acids" in the description and claims is intended to mean acids of any degree of concentration, including, for instance, sulphuric acid of over 50°, for example, acid of 66° Bé.

We claim:

1. A process for eliminating arsenic from acids which comprises treating acids at a temperature not substantially exceeding 50° C. with a compound containing the acid radicle of an oxyacid of sulphur having at least two directly linked sulphur atoms and separating the precipitated arsenic sulphide from the liquid.

2. A process for eliminating arsenic from sulphuric acid, which comprises treating the sulphuric acid at a temperature not substantially exceeding 50° C. with a compound containing the acid radicle of an oxyacid of sulphur having at least two directly linked sulphur atoms and separating the precipitated arsenic sulphide from the liquid.

3. A process for eliminating arsenic from acids which comprises treating the acid at a temperature not substantially exceeding 50° C. with a compound containing the acid radicle of a thionic acid and separating the precipitated arsenic sulphide from the liquid.

4. A process for eliminating arsenic from sulphuric acid which comprises treating the sulphuric acid at a temperature not substantially exceeding 50° C. with a thiosulphate.

5. A process for eliminating arsenic from acids, which comprises treating the acid at a temperature not substantially exceeding 50° C. with a compound containing the acid radicle of a thionic acid the action of which compound is adapted to form with the anion of the acid treated a compound which is difficultly soluble in water.

6. A process for eliminating arsenic from acids which comprises treating the acid at a temperature not substantially exceeding 50° C. with an excess of a compound containing the acid radicle of a thionic acid, decomposing the excess of the precipitating agent by the addition of an oxidizing agent and separating the precipitated arsenic sulphide from the liquid.

7. A process for eliminating arsenic from acids which comprises treating the acid at a temperature not substantially exceeding 50° C. with a salt of thiosulphuric acid in an amount corresponding to 5 to 8 parts $Na_2S_2O_3.5H_2O$ per 1 part of the arsenic to be separated out.

8. A process for eliminating arsenic from sulphuric acid containing higher oxides of nitrogen, which comprises treating the acid at a temperature not substantially exceeding 50° C. with a denitrating agent and thereafter with a compound containing the acid radicle of a thionic acid and finally separating the precipitated arsenic sulphide from the liquid.

9. Process for eliminating arsenic from the washing acid employed in a cycle for the dearsenification of the roasting gases, in the production of sulphuric acid by the contact process, said process consisting in treating the acid for the purpose of regeneration, after having been charged with arsenic at a temperature not substantially exceeding 50° C. with a compound containing the acid radicle of a thionic acid in a smaller amount than would be required for the complete precipitation of the arsenic.

In testimony whereof, we affix our signatures.

CONWAY, BARON von GIRSEWALD.
WOLFHART SIECKE.